(12) United States Patent
Wang (10) Patent No.: US 9,866,320 B2
(45) Date of Patent: Jan. 9, 2018

(54) INTENSITY-MODULATED DIRECT DETECTION WITH MULTI-CHANNEL MULTI-BEAMING

(71) Applicant: Facebook, Inc., Menlo Park, CA (US)

(72) Inventor: Shih-Cheng Wang, Cupertino, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/984,173

(22) Filed: Dec. 30, 2015

(65) Prior Publication Data

US 2017/0195061 A1 Jul. 6, 2017

(51) Int. Cl.
*H04B 10/112* (2013.01)
*H04J 14/02* (2006.01)
*H04B 10/50* (2013.01)
*H04L 7/033* (2006.01)

(52) U.S. Cl.
CPC ......... *H04B 10/112* (2013.01); *H04B 10/501* (2013.01); *H04J 14/02* (2013.01); *H04L 7/0331* (2013.01)

(58) Field of Classification Search
CPC ..... H04B 10/50–10/502; H04B 10/11–10/116; H04Q 2011/0026–2011/003
See application file for complete search history.

(56) References Cited

U.S. PATENT DOCUMENTS 4,521,075 A 6/1985 Obenschain et al.
5,339,177 A 8/1994 Jenkins et al.
6,097,861 A 8/2000 Kim et al.
6,731,878 B1 5/2004 Britz et al.
6,807,375 B2 10/2004 Dogariu et al.
(Continued)

FOREIGN PATENT DOCUMENTS

EP 2838217 A1 2/2015
JP 2013535871 A 9/2013
(Continued)

OTHER PUBLICATIONS

Non-Final Office Action dated Feb. 24, 2017, for U.S. Appl. No. 14/984,093, of Birnbaum, K., filed Dec. 30, 2015.
(Continued)

*Primary Examiner* — David Payne
*Assistant Examiner* — Casey Kretzer
(74) *Attorney, Agent, or Firm* — Perkins Coie LLP (57) ABSTRACT

Optical communication systems and methods using coherently combined optical beams are disclosed. A representative system includes a first data source for sending first data at a first frequency of a first optical beam to a first aperture, and at a second frequency of a second optical beam to a second aperture. The system further includes a second data source for sending second data at a third frequency of a third optical beam to the first aperture, and at a fourth frequency of a fourth optical beam to the second aperture. The system also includes a first interleaver of the first aperture configured to interleave the first data at the first frequency and the second data at the third frequency; and a second interleaver of the second aperture configured to interleave the first data at the second frequency and the second data at fourth frequency.

19 Claims, 4 Drawing Sheets

(56) References Cited

U.S. PATENT DOCUMENTS

| | | | |
|---|---|---|---|
| 7,643,754 | B2 | 1/2010 | Futami et al. |
| 7,920,794 | B1 | 4/2011 | Whaley et al. |
| 2002/0126479 | A1 | 9/2002 | Zhai et al. |
| 2004/0052535 | A1 | 3/2004 | Nohara et al. |
| 2004/0239946 | A1 | 12/2004 | Kane et al. |
| 2005/0196170 | A1 | 9/2005 | Winsor et al. |
| 2006/0078251 | A1* | 4/2006 | Ducellier ........... G02B 6/12011 385/16 |
| 2006/0088319 | A1* | 4/2006 | Morton ................ H04B 10/506 398/79 |
| 2008/0002986 | A1 | 1/2008 | Izumi et al. |
| 2009/0324243 | A1* | 12/2009 | Neilson .............. H04Q 11/0005 398/154 |
| 2010/0053474 | A1 | 3/2010 | Kamei et al. |
| 2011/0164884 | A1 | 7/2011 | Yamada et al. |
| 2012/0230685 | A1 | 9/2012 | Jung et al. |
| 2014/0029941 | A1 | 1/2014 | Bratkovski et al. |
| 2017/0195057 | A1 | 7/2017 | Birnbaum |

FOREIGN PATENT DOCUMENTS

| | | |
|---|---|---|
| KR | 1020140075861 A | 6/2014 |
| WO | 2005002102 A1 | 1/2005 |
| WO | 2005119942 A2 | 12/2005 |

OTHER PUBLICATIONS

U.S. Appl. No. 14/984,093 by K. Birbaum, filed Dec. 30, 2015.
International Search Report and Written Opinion in International Application No. PCT/US2016/069019, dated Apr. 17, 2017, 9 pages.
International Search Report and Written Opinion in International Application No. PCT/US2016/069033, dated Apr. 17, 2017, 9 pages.
Yahya, M., et al., "Transmit optics analysis for Free Space Optics improvements." IEEE International RF and Microwave Conference, Mar. 15, 2012, pp. 262-263.
Notice of Allowance dated Oct. 3, 2017 for U.S. Appl. No. 14/984,093, of Birnbaum, K., filed Dec. 30, 2015.

* cited by examiner

INTENSITY-MODULATED DIRECT DETECTION WITH MULTI-CHANNEL MULTI-BEAMING

TECHNICAL FIELD

The disclosed embodiments generally relate to the field of optical communication, and more specifically to transmitting beams of light from multiple data sources into one or more apertures. In some embodiments, the beams of light are transmitted at different frequencies (i.e., using non-coherent transmission) through the atmosphere to reduce or eliminate the effects of signal fading caused by atmospheric turbulence.

BACKGROUND

Errors in optically transmitted data are caused by a number of different factors, including distortion of optical signals in the air. In free-space optical communications systems that propagate optical signals through air, turbulence can be a significant source of channel impairment. For example, anomalous refraction of an optical beam (e.g., scintillation) can be caused by small-scale fluctuations in air density that result from temperature or pressure gradients along the path of the optical beam. These atmospheric fluctuations can cause frequency-nonselective fades in the optical beam's power. The fade process has a correlation time which is typically much longer than the duration of a typical symbol in the optical beam, therefore reducing the signal-to-noise ratio of the data stream.

To reduce the effects of optical beam fading, some conventional technologies apply channel equalization and forward error correction (FEC) coding at the physical layer. Channel equalization is used to reduce the inter-symbol interference that is induced by band-limiting in the receiver or channel. Forward error correction at the physical layer introduces a structured redundancy on the transmitted symbol sequence that can be exploited at the receiver to correct errors in recovering the transmitted data due to channel impairments. However, the complexity associated with encoding and decoding a physical layer with a FEC code increases with the length of the codeword. For example, in high data rate systems, a codeword should span multiple channel coherence times to enable recovery of the symbols lost due to optical beam fading. However, such a codeword would be prohibitively complex to handle in many practical situations.

With other conventional technologies, lost data may be retransmitted from a transmitter to a receiver upon detecting data loss (e.g., a dropped data frame). However, in many cases, the additional round-trip latency caused by the retransmission requests and the need for an additional feedback channel make these technologies impractical or undesirable.

Another conventional approach to mitigate fading relies on spatial diversity. Since turbulence has a transverse correlation length $r_0$, if two optical source beams are separated by a distance D, then their fades will become statistically independent when $D \gg r_0$. Therefore, turbulence-induced errors in the optical beam (e.g., scintillation) are sufficiently non-correlated for optical beams that are spaced sufficiently apart. A conventional technology that utilizes spatial diversity to mitigate turbulence is called multi-beaming. The multi-beaming technique includes sending the same symbol along different paths separated by D, where $D \gg r_0$, such that different paths experience statistically independent fades and phase offsets. In this scenario, the total received signal intensity is the sum of several independent optical beams, each characterized by independent fading processes. As a result, the total received signal will thus have a smaller optical beam fading. However, this approach is only suitable when information is encoded by intensity, but is not applicable when the optical phase carries information. Accordingly, there remains a need for improved technique for the transmission of optical data at high data rates and low latency of the data transmission.

DETAILED DESCRIPTION

Embodiments are directed to non-coherent combining light beams emitted by multiple data sources and received by multiple transmitting (TX) apertures. The received data-carrying optical beams may be non-coherently combined at their respective TX apertures because the optical beams have different wavelengths, frequencies, phases, or polarization angles. The combined optical beams can be sent through the atmosphere to a receiving (RX) aperture. Because the combined optical beams arrived to the RX aperture along paths having statistically uncorrelated turbulence the optical beams may also have statistically uncorrelated signal fading, therefore improving signal-to-noise ratio of the optical beams reconstructed at the RX aperture. In some embodiments, the optical beams at individual TX apertures can be combined using an optical multiplexer (MUX) and dense wavelength division multiplexing (DWDM), resulting in improved data throughput from the TX apertures to the RX aperture.

Briefly described, various embodiments use arrangements for non-coherently sending optical beams from multiple (e.g., two or more) TX apertures to one or more RX apertures. For example, a first data source may send multiple optical beams at different frequencies, wavelengths, phases or polarization angles to the corresponding TX apertures through optical fiber or the atmosphere. The multiple optical beams emitted by the first data source may carry same data. A second data source can also send data to the same set of TX apertures using multiple optical beams at another set of frequencies, wavelengths, phases or polarization angles. More data sources may similarly be employed to, for example, match the number of data sources to the number of the TX apertures. Therefore, in some embodiments, each TX aperture combines the incoming data from several data sources at different frequencies, and sends the data to a receiving (RX) aperture. In some embodiments, the optical beams propagate from the TX apertures to the RX aperture through the atmosphere over relatively long distances (e.g., kilometer scale), and are therefore exposed to scintillating effects of the turbulence. However, in at least some embodiments, the optical beams originating from different TX apertures may be spatially separated enough to be exposed to statistically non-correlated optical fading effects. Therefore, combining the optical light beams that carry the same data from different TX apertures along different paths may reduce the optical fading effects (e.g., the symbol loss).

In some embodiments, an interleaver (a multiplexer or MUX) at the TX aperture may interleave the optical beams arriving from multiple data sources based on, e.g., first-in-first-out (FIFO) method. In some embodiments, routing data from multiple data sources to multiple TX apertures may create timing inaccuracies among the optical beams arriving to the TX aperture or among the TX apertures, because of, for example, different paths of the optical beams. Therefore, in at least some embodiments, data rates can be synchronized using FIFOs (e.g., for a coarse adjustment) and phase-locked-loops (PLLs) (e.g., for a fine adjustment). The TX apertures may combine several frequencies of light that correspond to the frequencies of light sent by the data sources. In some embodiments, the TX apertures may use dense wavelength division multiplexing (DWDM) to combine optical beams and to send data to the RX aperture at a higher data rate.

Figure 1:
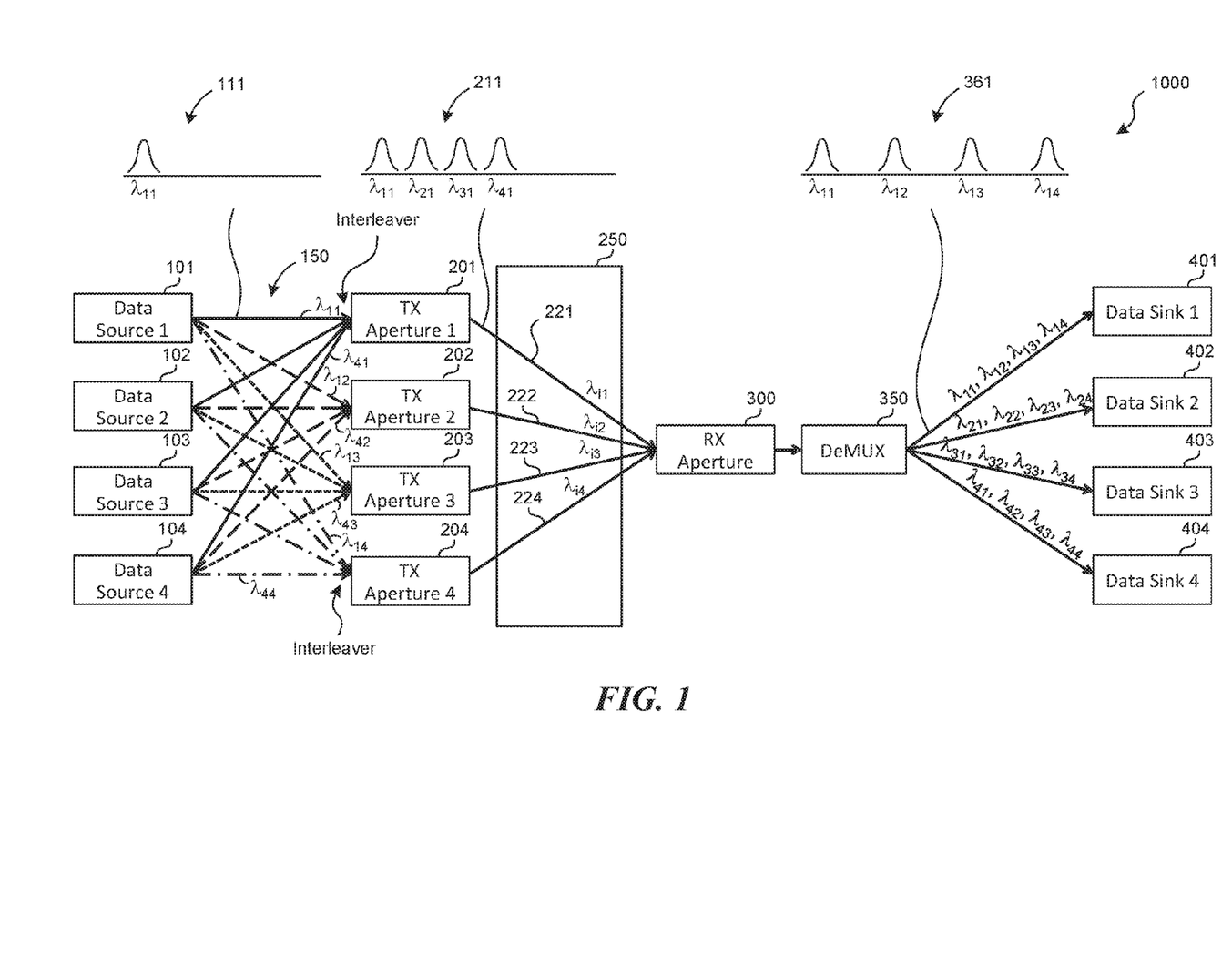
FIG. 1 is a schematic diagram illustrating a system for transmitting optical data transmission through the atmosphere in accordance with various embodiments.

FIG. 1 is a schematic diagram illustrating optical data transmission through the atmosphere in accordance with various embodiments. In the illustrated system 1000, TX apertures 201-204 combine data from four data sources 101-104, and send optical beams through the atmosphere 250 to an RX aperture 300. In some embodiments, each of the four data sources 101-104 sends data-carrying optical beams 150 to the TX apertures 201-204. For example, the TX aperture 203 receives optical beams at wavelengths $\lambda_{13}$ from data source 101, $\lambda_{23}$ from data source 102, $\lambda_{33}$ from data source 103, and $\lambda_{43}$ from data source 104. In the illustrated example, each TX aperture receives data from four data sources, but other combinations of the data sources and the TX apertures are also possible. For example, the number of the TX apertures may be greater than the number of the data sources for additional reduction of data fading caused by turbulence. In at least some embodiments, the optical beams 150 can be generated by lasers or light emitting diodes (LEDs), and may be transferred to the TX apertures 201-204 through the atmosphere or optical fiber. In some embodiments, the optical beams 150 propagate over a relatively short distance (e.g., less than several meters) from the data sources 101-104 to the TX apertures 201-204.

In some embodiments, the optical beams 150 are multiplexed at the TX apertures 201-204 before sending the multiplexed optical beams 221-224 through the atmosphere 250. For example, the TX aperture 202 may multiplex optical beams at wavelengths $\lambda_{12}$ from data source 101, $\lambda_{22}$ from data source 102, $\lambda_{32}$ from data source 103, and $\lambda_{42}$ from data source 104, and then send a combined optical beam 222 at wavelengths $\lambda_{12}$-$\lambda_{42}$ through the atmosphere 250 to the RX aperture 300. An example of a set of optical beam frequencies (in THz) for a sample combination of data sources and apertures is shown in Table 1 below.

TABLE 1

| Aperture | Data Source | | | |
| --- | --- | --- | --- | --- |
| | 1 | 2 | 3 | 4 |
| 1 | 194.4 | 194.35 | 194.3 | 194.25 |
| 2 | 194.2 | 194.15 | 194.1 | 194.05 |
| 3 | 194.0 | 193.95 | 193.9 | 193.85 |
| 4 | 193.8 | 193.75 | 193.7 | 193.65 |

For the embodiment illustrated in Table 1, the frequencies of the optical beams emitted by the same data source are 50 MHz apart. For example, the data source 1 (e.g., data source 101 in FIG. 1) can emit four optical beams in the range of 193.8-194.4 THz, with the difference between adjacent frequencies being 0.2 THz or 200 MHz. As explained above, in at least some embodiments, the data source 101 sends the same data on the four optical beams (e.g., the wavelength $\lambda_{11}$ of a waveform 111 sent to TX aperture 201). In the embodiment illustrated in Table 1, the aperture 2 can receive data from data source 1 at 194.2 THz, from data source 2 at 194.15 THz, from data source 3 at 194.1 THz, and from data source 4 at 194.05 THz. Therefore, the frequencies of the four optical beams received by the aperture 2 are 0.05 THz or 50 MHz apart. In at least some embodiments, the different frequencies of the optical beams enable combining the optical beams (and the symbols embedded in the optical beams) using, for example, DWDM before sending the combined beam from any of the TX apertures to the RX aperture. For the example illustrated in Table 1, the frequency offset for the DWDM for any of the apertures is 50 MHz (i.e., four optical beams offset by 50 MHZ for a total frequency spectrum of 200 MHz allocated per an aperture). Other combinations of the numbers of apertures and data sources, and their corresponding frequencies are possible.

The TX apertures 201-204 may send their corresponding optical beams 221-224 to the RX aperture 300. As explained above, each optical beam 221-224 may include multiple optical beams at different wavelengths that are wavelength-division multiplexed, and sent along the same path to the RX aperture 300 (e.g., a set of wavelengths $\lambda_{11}$, $\lambda_{21}$, $\lambda_{31}$ and $\lambda_{41}$ in a waveform 211 sent from TX aperture 201). For example, the aperture 4 may emit the optical beam 224 that combines four wavelengths: $\lambda_{14}$, $\lambda_{24}$, $\lambda_{34}$ and $\lambda_{44}$ from the optical beams received from the four data sources 101-104. Using the example illustrated in Table 1, the data source 4 would emit a wavelength-division multiplexed optical beam that includes the frequencies 193.8 THz, 193.75 THz, 193.7 THz and 193.65 THz. In at least some embodiments, the optical beams 221-224 may be sufficiently apart such that they experience a statistically uncorrelated beam fading. As a result, the incidence of symbol loss due to beam fading may be reduced. In some embodiments, a distance between the RX aperture and the TX apertures may be several hundred meters or several kilometers.

In some embodiments, the RX aperture 300 sends the received optical beams 221-224 to a deinterleaver (deMUX) 350 through, for example, an optical fiber. In some embodiments, the deinterleaver 350 may deinterleave the optical beams 221-224 back to or close to the frequencies/wavelengths of the optical beams 150 sent by the data sources 101-104 (e.g., $\lambda_{11}$-$\lambda_{44}$). The deinterleaver 350 can route the deinterleaved optical beams to data sinks 401-404 through optical fiber or the atmosphere. For example, in one embodiment, the deinterleaver 350 can send optical beams using a set of wavelengths $\lambda_{11}$, $\lambda_{12}$, $\lambda_{13}$ and $\lambda_{14}$ in in a waveform 361 to the data sink 401. Additionally, the deinterleaver 350 can send optical beams to the data sink 403 at the wavelengths $\lambda_{31}$, $\lambda_{32}$, $\lambda_{33}$ and $\lambda_{34}$. As a result, in the illustrated embodiment, the data sink 403 receives the data sent from the data source 103. As explained above, if the optical beams 221-224 are spaced apart enough to experience statistically uncorrelated fading, then the optical beams received by the data sink 403 at the wavelengths $\lambda_{31}$, $\lambda_{32}$, $\lambda_{33}$ and $\lambda_{34}$ may be summed (or otherwise combined) to reduce or eliminate the symbol loss caused by the optical beam fade. Analogously, the data sinks 401, 402 and 404 may receive the optical beams that were sent by the data sources 101, 102 and 104, respectively. The deinterleaving of the optical beams in the deMUX 350 is described in more detail with reference to FIG. 2 below.

Figure 2:
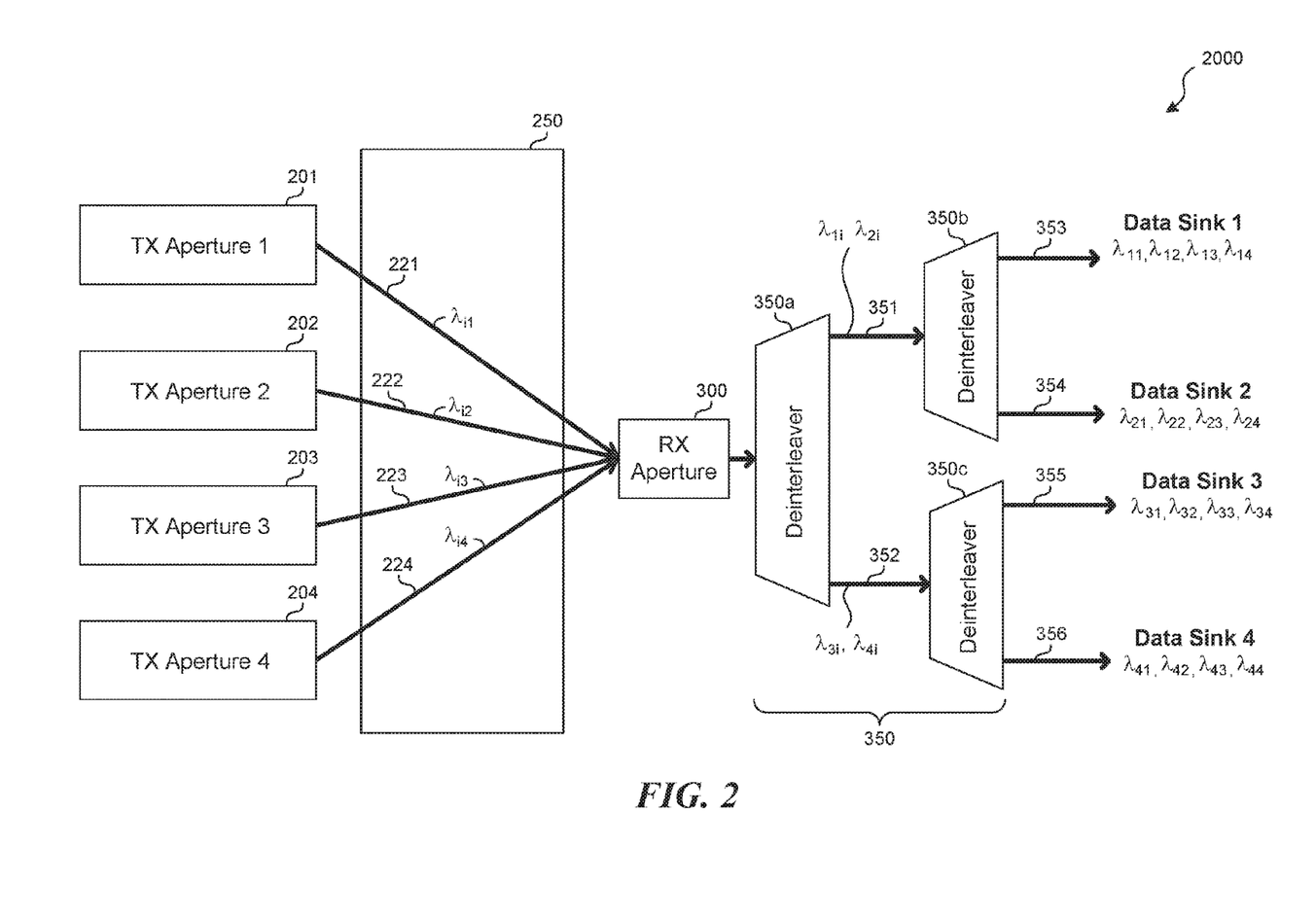
FIG. 2 is a schematic diagram illustrating a system for transmitting optical data by deinterleaving at a receiver (RX) in accordance with various embodiments.

FIG. 2 is a schematic diagram illustrating optical data deinterleaving at the receiver (RX) in accordance with various embodiments. In the illustrated embodiment, the TX apertures 201-204 send combined optical beams 221-224 to the RX aperture 300. In some embodiments, each optical beam 221-224 may be generated using a MUX that applies DWDM on the optical beams received from the data sources. The RX aperture 300 may send the received combined optical beams 221-224 to the deinterleaver (deMUX) 350. In some embodiments, the deinterleaver 350 may include multiple stages, e.g., a deinterleaver 350a in the first stage and deinterleavers 350b and 350c in the second stage. For example, the deinterleaver 350 may deinterleave the incoming optical beams into two optical beams: an optical beam 351 that includes optical beams sent from data sources 101 and 102, and an optical beam 352 that includes optical beams sent from data sources 103 and 104. In some embodiments, the optical beam 351 is received by the deinterleaver 350b in the second stage, and is further deinterleaved into two optical beams; an optical beam 353 that includes the optical beams sent from the data source 1 at the wavelengths $\lambda_{11}, \lambda_{12}, \lambda_{13}$ and $\lambda_{14}$, and an optical beam 354 that includes the optical beams sent from the data source 2 at the wavelengths $\lambda_{21}, \lambda_{22}, \lambda_{23}$ and $\lambda_{24}$. Analogously, the optical beam 352 may be deinterleaved into an optical beam 355 that includes the optical beams sent from the data source 3 at the wavelengths $\lambda_{31}, \lambda_{32}, \lambda_{33}$ and $\lambda_{34}$, and an optical beam 356 that includes the optical beams sent from the data source 4 at the wavelengths $\lambda_{41}, \lambda_{42}, \lambda_{43}$ and $\lambda_{44}$. Other combinations of deinterleaving the incoming optical beams are also possible. For example, in some embodiments a single deinterleaver may be used. In other embodiments, three or more stages of deinterleaving may be used.

Figure 3:
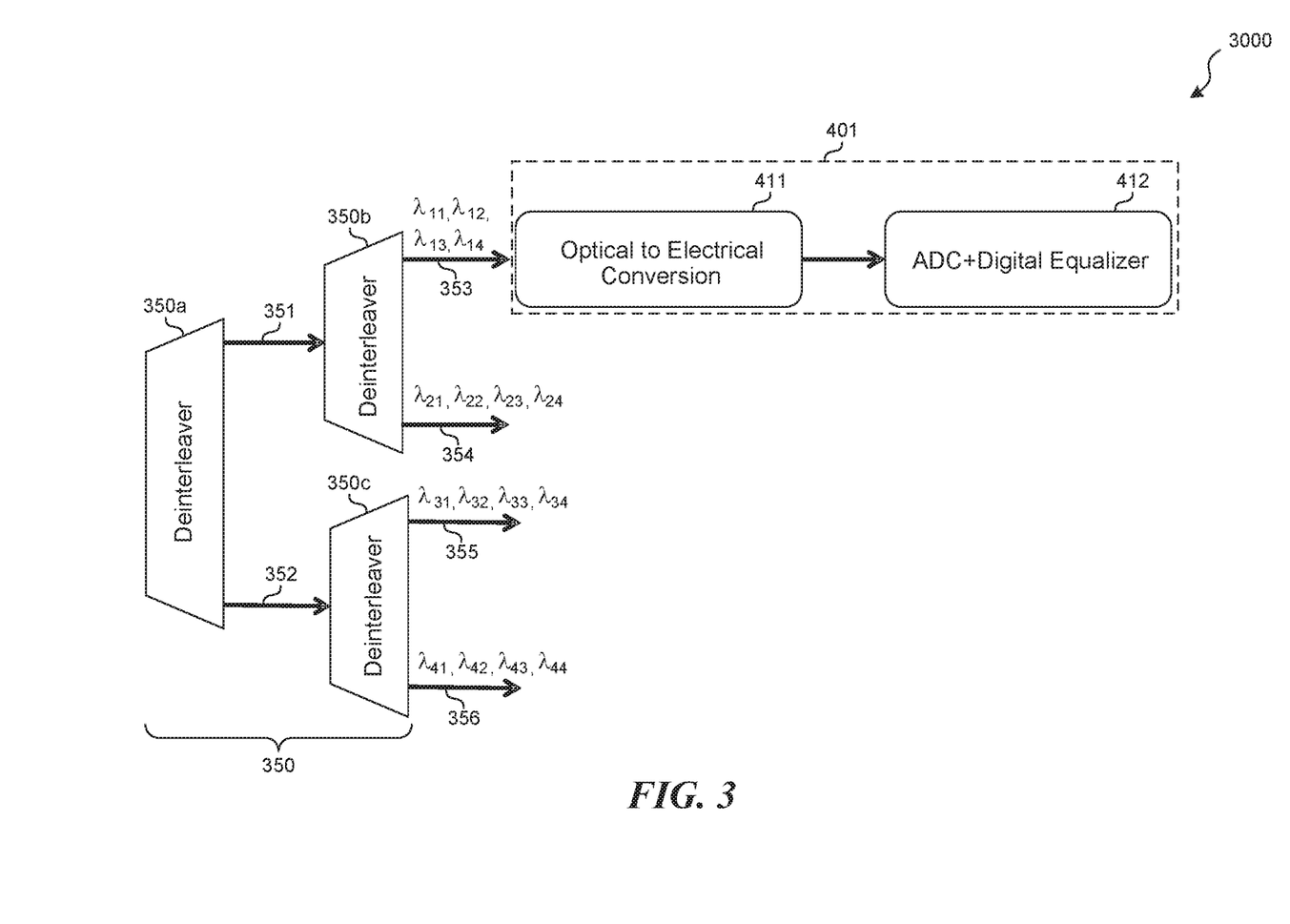
FIG. 3 is a schematic diagram of a system for converting optical data at the RX in accordance with various embodiments.

FIG. 3 is a schematic diagram illustrating optical data conversion at the RX in accordance with various embodiments. In some embodiments, the deinterleaver 350 may deinterleave the incoming optical beams into four optical beams 353-356, each respectively including the optical beams from one of the data sources 101-104. For example, the optical beam 353 may include four optical beams at the wavelengths $\lambda_{11}, \lambda_{12}, \lambda_{13}$ and $\lambda_{14}$ sent by the data source 101 and received by the data sink 401. The optical beam 353 may be converted to electrical signals in a converter 411 (e.g. a photo diode). For at least some DWDM schemes, the resulting electrical signals (e.g., corresponding to symbols in the optical beam) may be reconstructed as:

$$S(\lambda_1(t)) = S(\lambda_{11}(t)) + S(\lambda_{12}(t-\tau_2)) + S(\lambda_{13}(t-\tau_3)) + S(\lambda_{14}(t-\tau_4))$$ (Equation 1)

where $S(\lambda_1(t))$ is a reconstructed signal from the data source 101 corresponding to time t, $S(\lambda_{11}(t))$ is signal sent by the data source 101 at time t using wavelength $\lambda_{11}$, $S(\lambda_{12}(t-\tau_2))$ is a signal sent by the data source 101 at time t using wavelength $\lambda_{12}$, etc. Generally, the time offsets $\tau_2, \tau_3$ and $\tau_4$ can be selected to account for the interleaving time offsets of the DWDM schemes. Furthermore, the non-coherency of the optical beams (e.g., the light beams having different wavelengths) enables the transmission and summing of the optical beams at the receiver. In at least some embodiments, a sufficient spatial separation of the optical beams results in lower statistical coherence in optical beam fading that improves symbol recovery when the optical beams are combined using Equation 1. In at least some embodiments, a digital equalizer 412 may adjust amplitudes of the signals S.

Figure 4:
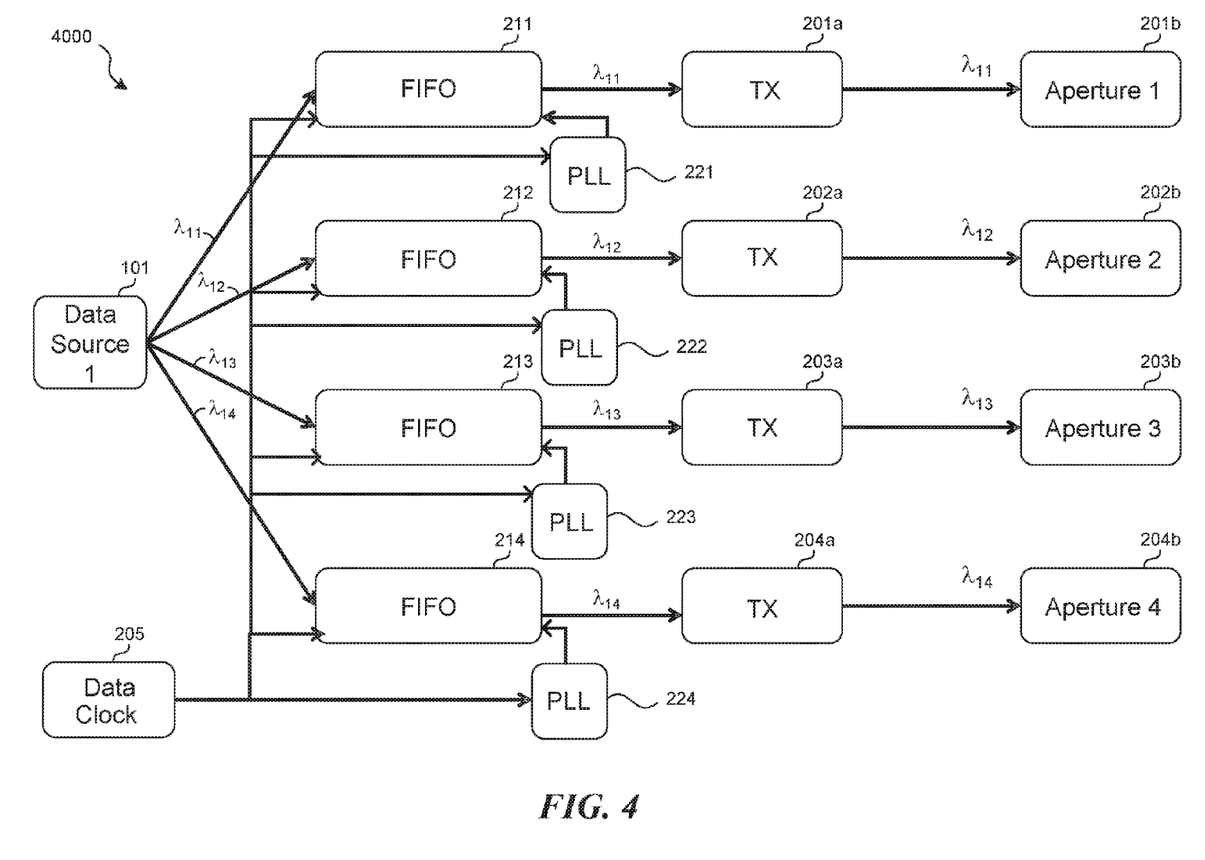
FIG. 4 is a schematic diagram of a system for compensating for delays at a transmitter (TX) in accordance with various embodiments.

FIG. 4 is a schematic diagram illustrating delay compensation at the transmitter (TX) in accordance with various embodiments. In some embodiments, routing the optical beams from the data sources to different TX apertures may result in uneven arrival times at the TX apertures. For example, one optical beam may travel over a longer distance and therefore be delayed with respect to another optical beam. In at least some embodiments, the delays of the optical beams may correspond to a fraction of a baud (symbol per second), therefore being difficult to adjust for using, for example, optical fiber splicing. In at least some embodiments, an electronic compensation may be used to reduce or eliminate the delays between the optical beams. In the illustrated system 4000, the data source 101 sends optical beams to FIFOs 211-214. In at least some embodiments, each FIFO can receive optical beams from additional data sources, e.g., from data sources 102-104. In some embodiments, the FIFOs may be connected to a common data clock 205 for synchronizing the operation of the FIFOs. For example, the common data clock 205 may clock data from data sources to the FIFOs, therefore providing at least a coarse synchronization of the optical beam arrival. In some embodiments, the PLLs 221-224 may provide a fine synchronization of the optical beam arrival by independently adjusting the phase of the optical beams interleaving to a sub-baud level. The synchronized interleaved optical beams from the data sources (only one data source is illustrated) may be sent to the TXs 201a-204a and the apertures 201b-204b. In at least some embodiments, the combination of the coarse and fine synchronization (adjustment) improves signal-to-noise ratio at the RX apertures. In some embodiments, the coarse synchronization may be used, while the fine synchronization is not used.

From the foregoing, it will be appreciated that specific embodiments of the invention have been described herein for purposes of illustration, but that various modifications may be made without deviating from the scope of the invention. For example, in some embodiments the optical beams may propagate through a vacuum, or a combination of air and vacuum. In some embodiments, the optical beams may have frequency that is not visible, for example, frequency higher than that of visible light. In some embodiments, multiple RX apertures may be used. For example, one RX aperture may receive optical beams from a subset of TX apertures, while the remaining optical beams are received by another RX aperture. Accordingly, the invention is not limited, except as by the appended claims.

The invention claimed is:

1. An optical communication system, comprising:
    a first data source configured to send first data—
        at a first frequency of a first optical beam to a first aperture, and
        at a second frequency of a second optical beam to a second aperture;
    a second data source configured to send second data—
        at a third frequency of a third optical beam to the first aperture, and
        at a fourth frequency of a fourth optical beam to the second aperture;
    a first interleaver of the first aperture configured to interleave the first data at the first frequency and the second data at the third frequency;

a second interleaver of the second aperture configured to interleave the first data at the second frequency and the second data at the fourth frequency; and
a receive (RX) aperture configured to receive the first data at the first and the second frequencies, and the second data at the third and the fourth frequencies.

2. The system of claim 1 wherein:
the first data source is further configured to send the first data—
   at a fifth frequency of a fifth optical beam to a third aperture, and
   at a sixth frequency of a sixth optical beam to a fourth aperture;
the second data source is further configured to send the second data—
   at a seventh frequency of a seventh optical beam to the third aperture, and
   at an eighth frequency of an eighth optical beam to the fourth aperture;
the optical system further comprising:
a third data source configured to send third data—
   at a ninth frequency of a ninth optical beam to the first aperture,
   at a tenth frequency of a tenth optical beam to the second aperture,
   at an eleventh frequency of an eleventh optical beam to the third aperture, and
   at a twelfth frequency of a twelfth optical beam to the fourth aperture;
a fourth data source configured to send fourth data—
   at a thirteenth frequency of a thirteenth optical beam to the first aperture,
   at a fourteenth frequency of a fourteenth optical beam to the second aperture,
   at a fifteenth frequency of a fifteenth optical beam to the third aperture, and
   at a sixteenth frequency of a sixteenth optical beam to the fourth aperture;
a third interleaver of the third aperture configured to interleave the first data at the fifth frequency, the second data at the seventh frequency, the third data at the eleventh frequency, and the fourth data at the fifteenth frequency; and
a fourth interleaver of the fourth aperture configured to interleave the first data at the sixth frequency, the second data at the eighth frequency, the third data at the twelfth frequency, and the fourth data at the sixteenth frequency.

3. The system of claim 1 wherein adjacent frequencies of the optical beams are offset by a constant difference.

4. The system of claim 2, further comprising:
a first first-in-first-out (FIFO) element between the first data source and the first aperture;
a second FIFO element between the first data source and the second aperture;
a third FIFO element between the second data source and the first aperture; and
a fourth FIFO element between the second data source and the second aperture,
wherein each FIFO element is configured to output received data in order of receiving the received data.

5. The system of claim 4, further comprising a common data clock for synchronizing the FIFO elements.

6. The system of claim 5, further comprising:
a first phase-locked-loop (PLL) connected to the first FIFO element;
a second PLL connected to the second FIFO element;
a third PLL connected to the third FIFO element; and
a fourth PLL connected to the fourth FIFO element,
wherein the PLLs are connected to a common data clock for synchronizing the FIFO elements.

7. The system of claim 1, further comprising a deinterleaver configured to: receive the first data at the first and the second frequencies from the RX aperture, and to receive the second data at the third and the fourth frequencies from the RX aperture; send the first data at the first and the second frequencies to a first data sink; and send the second data at the third and the fourth frequencies to a second data sink.

8. The system of claim 2, further comprising:
a receive (RX) aperture configured to receive the first data, the second data, the third data, and the fourth data;
a first deinterleaver configured to receive the first data, the second data, the third data, and the fourth data from the RX aperture;
a second deinterleaver configured to—
   receive the first data and the second data from the first deinterleaver,
   send the first data to a first data sink, and
   send the second data to a second data sink; and
a third deinterleaver configured to—
   receive the third data and the fourth data from the first deinterleaver,
   send the third data to a third data sink, and
   send the second data to a fourth data sink.

9. The system of claim 8 wherein the first data sink comprises:
an optical to electrical conversion unit;
an analog to digital conversion (ADC) unit; and
a digital equalizer.

10. A method for optical communication, comprising:
sending first data from a first data source—
   to a first aperture at a first frequency of a first optical beam, and
   to a second aperture at a second frequency of a second optical beam;
sending second data from a second data source—
   to the first aperture at a third frequency of a third optical beam, and
   to the second aperture at a fourth frequency of a fourth optical beam;
interleaving the first data at the first frequency of the first optical beam with the second data at the third frequency of the third optical beam using a first interleaver of the first aperture to generate first interleaved data;
interleaving the first data at the second frequency of the second optical beam with the second data at the fourth frequency of the fourth optical beam using a second interleaver of the second aperture to generate second interleaved data;
sending the first interleaved data from the first aperture to a receive (RX) aperture using a first transmission beam; and
sending the second interleaved data from the second aperture to the RX aperture using a second transmission beam.

11. The method of claim 10, further comprising:
sending the first data from the first data source—
   to a third aperture at a fifth frequency of a fifth optical beam, and
   to a fourth aperture at a sixth frequency of a sixth optical beam;
sending the second data from the second data source—
   to the third aperture at a seventh frequency of a seventh optical beam, and to the fourth aperture at an eighth frequency of an eighth optical beam;

sending third data from a third data source—
- to the first aperture at a ninth frequency of a ninth optical beam,
- to the second aperture at a tenth frequency of a tenth optical beam,
- to the third aperture at an eleventh frequency of an eleventh optical beam, and
- to the fourth aperture at a twelfth frequency of a twelfth optical beam;

sending fourth data from a fourth data source—
- to the first aperture at a thirteenth frequency of a thirteenth optical beam,
- to the second aperture at a fourteenth frequency of a fourteenth optical beam,
- to the third aperture at a fifteenth frequency of a fifteenth optical beam, and
- to the fourth aperture at a sixteenth frequency of a sixteenth optical beam;

using the first interleaver of the first aperture, interleaving the third data at the ninth frequency of the ninth optical beam with the fourth data at the thirteenth frequency of the thirteenth optical beam;

using the second interleaver of the second aperture, interleaving the third data at the tenth frequency of the tenth optical beam with the second data at the fourteenth frequency of the fourteenth optical beam;

using a third interleaver of the third aperture, interleaving the first data at the fifth frequency of the first optical beam, the second data at the seventh frequency of the seventh optical beam, the third data at the eleventh frequency of the eleventh optical beam, and the fourth data at the fifteenth frequency of the fifteenth optical beam; and using a fourth interleaver of the fourth aperture, interleaving the first data at the sixth frequency of the sixth optical beam, the second data at the eighth frequency of the eighth optical beam, the third data at the twelfth frequency of the twelfth optical beam, and the fourth data at the sixteenth frequency of the sixteenth optical beam; and sending interleaved data to the RX using the first transmission beam for the first aperture, the second transmission beam for the second aperture, a third transmission beam for the third aperture, and a fourth transmission beam for the fourth aperture.

12. The method of claim 11 wherein adjacent frequencies of the optical beams are offset by a constant difference.

13. The method of claim 12 wherein the constant difference is a first constant difference, and wherein adjacent frequencies of the transmission beams are offset by a second constant difference.

14. The method of claim 10, further comprising:
receiving the first data at the first frequency of the first optical beam by a first first-in-first-out (FIFO) element;
receiving the second data at the third frequency of the third optical beam by a second FIFO element;
synchronizing the first and the second FIFO elements using a common data clock.

15. The method of claim 11, further comprising:
receiving the first data at the first frequency of the first optical beam by a first first-in-first-out (FIFO) element;
receiving the second data at the third frequency of the third optical beam by a second FIFO element;
receiving the third data at the ninth frequency of the ninth optical beam by a third FIFO element;
receiving the fourth data at the thirteenth frequency of the thirteenth optical beam by a fourth FIFO element;
synchronizing the first, the second, and the fourth FIFO elements using a common data clock.

16. The method of claim 15, further comprising:
synchronizing the first FIFO element using a first phase-locked-loop (PLL) connected to the common data clock;
synchronizing the second FIFO element using a second PLL connected to the common data clock;
synchronizing the third FIFO element using a third PLL connected to the common data clock; and
synchronizing the fourth FIFO element using a fourth PLL connected to the common data clock.

17. The method of claim 10, further comprising receiving the first data at the first and the second frequencies, and the second data at the third and the fourth frequencies by the RX aperture.

18. The method of claim 17, further comprising:
receiving the first data and the second data by a deinterleaver from the RX aperture;
deinterleaving the first data and the second data;
sending the first data at the first and second the frequencies to a first data sink; and
sending the second data at the third and the fourth frequencies to a second data sink.

19. The method of claim 18 further comprising:
converting the first data and the second data from optical to analog electrical signals;
converting the analog electrical signals to digital electrical signals; and
equalizing the digital electrical signals.

* * * * *